US008888007B2

(12) United States Patent
Raschner et al.

(10) Patent No.: US 8,888,007 B2
(45) Date of Patent: Nov. 18, 2014

(54) METHOD AND SYSTEM FOR ISSUING PORTABLE DATA CARRIERS

(75) Inventors: Patrick Raschner, München (DE); Bernd Brus, Forstern (DE); Michael Ritzer, Weilheim (DE); Bernhard Seen, Oberhausen (DE)

(73) Assignee: Giesecke & Devrient GmbH, Munich (DE)

( * ) Notice: Subject to any disclaimer, the term of this patent is extended or adjusted under 35 U.S.C. 154(b) by 162 days.

(21) Appl. No.: 13/565,300

(22) Filed: Aug. 2, 2012

(65) Prior Publication Data

US 2013/0032636 A1 Feb. 7, 2013

(30) Foreign Application Priority Data

Aug. 4, 2011 (EP) .................................... 11006427

(51) Int. Cl.
*G06K 19/00* (2006.01)
*G06Q 20/34* (2012.01)
*G07F 7/10* (2006.01)

(52) U.S. Cl.
CPC ............ *G06Q 20/355* (2013.01); *G07F 7/1008* (2013.01)
USPC ......... 235/487; 235/380; 235/382.5; 235/495

(58) Field of Classification Search
CPC .............. G06Q 20/354; G06Q 20/355; G06Q 20/3552; G06Q 20/3555; G06Q 20/3558
USPC ................ 235/487, 380, 382.5, 495
See application file for complete search history.

(56) References Cited

U.S. PATENT DOCUMENTS

| 4,772,782 A | 9/1988 | Nonat |
| 5,889,941 A | 3/1999 | Tushie et al. |
| 6,014,748 A | 1/2000 | Tushie et al. |
| 6,196,459 B1 * | 3/2001 | Goman et al. ................ 235/380 |
| 6,202,155 B1 | 3/2001 | Tushie et al. |
| 7,500,601 B2 | 3/2009 | Goman et al. |
| 2002/0117542 A1 | 8/2002 | Hamann et al. |
| 2003/0050899 A1 | 3/2003 | Tushie et al. |

FOREIGN PATENT DOCUMENTS

| EP | 1515266 A1 | 3/2005 |
| EP | 1762988 A1 | 3/2007 |

OTHER PUBLICATIONS

Colette Joliet, "An Integrated Personalization Workshop for Smart Cards", Sep. 4, 1991, Gemplus Card International, XP-002108140, pp. 99-108.

* cited by examiner

*Primary Examiner* — Kristy A Haupt
(74) *Attorney, Agent, or Firm* — Workman Nydegger

(57) ABSTRACT

A method for managing issuance of a portable data carrier using multiple production units for issuing portable data carriers, a data provisioning unit and an assignment unit. The data provisioning unit receives data for the portable data carrier in a production unit independent format. At least one production unit is assigned to use the data for issuing the portable data carrier in the assignment unit. The data are provided by the data provisioning unit to the assigned production unit and the portable data carrier is issued in the assigned production unit. The data are provided by the data provisioning unit to the assigned production unit in response to a data independent polling for data by the assigned production unit and in the production unit independent format. In the assigned production unit the provided data are converted from the production unit independent format into a production unit dependent format.

14 Claims, 1 Drawing Sheet

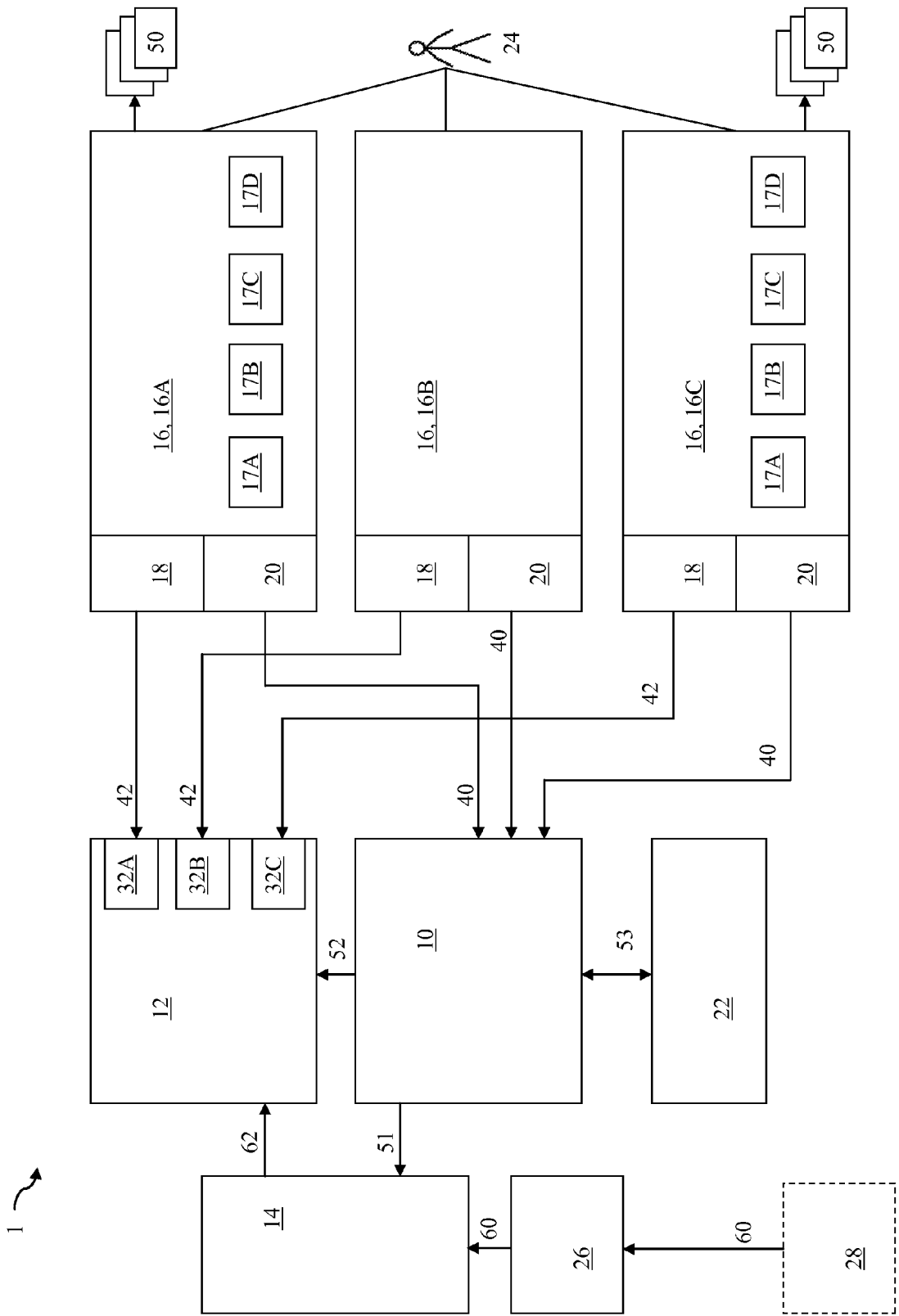

METHOD AND SYSTEM FOR ISSUING PORTABLE DATA CARRIERS

BACKGROUND OF THE INVENTION

A. Field of the Invention

The present invention relates generally to a method and system issuing portable data carriers.

B. Related Art

Portable data carriers contain personal information specific to a holder of the data carrier and are used for a variety of purposes. Examples of portable data carriers include credit cards, debit or Automated Teller Machine (ATM) cards, identification cards, subscriber identification module (SIM) cards or other types of data carriers which are programmed with identification or transactional data. The data stored thereon can be stored in magnetic strips, integrated circuits or may be physically embodied on a surface of the data carrier itself.

For example, a credit card can include a magnetic strip and/or an embedded chip having integrated circuits (so-called IC cards or smart cards) which store data such as security information and information identifying the holder of the card, accounts of the holder, authorizations of the holder, etc. Such a credit card will also typically be unique to particular financial institutions, such as a bank or credit institute, and will be printed or embossed with the account holder name, account numbers and expiration date.

The financial institutions and other issuers of the data carriers usually have unique requirements for production of the data carriers. The issuers of the data carriers may provide, to the producer or manufacturer of the data carrier, the data to be programmed onto the data carrier in a variety of formats and can request unique carrier types and special security requirements for protecting the data programmed thereon. Additionally, the producer of the data carriers utilizes production equipment which may have different capabilities and which program and issue the data carrier according to instructions and commands that can be unique to the type of production equipment.

U.S. Pat. Nos. 5,889,941 and 6,014,748 describe a system and apparatus for the personalization of smart cards in which a centralized system is used to convert the data from the issuer based on the particular requirements of a type of personalization equipment. Data that is characteristic of the individual personalization equipment types is stored in a central database and accessed using a unique identifier of the personalization equipment. However, the central database is large and onerous to utilize because it must contain data that is characteristic of each personalization equipment type (each individually accessible only through a unique identifier) and because the centralized system must use this data to convert the data provided by the issuer in a wide variety of formats before any programming commands or data is sent to the individual personal equipment.

U.S. Pat. Nos. 6,196,459 and 7,500,601 describe a smart card personalization system in which a central server controls the programming by a plurality of personalization stations. However, this system is also quite onerous because the central server must contain different instructions and commands based on each particular personalization station type and be in constant communication with each of the personalization stations in order to control the programming of a particular smart card.

SUMMARY OF THE INVENTION

It is an object of the present invention to provide a more flexible data carrier issuing system.

DESCRIPTION OF THE DRAWINGS

The present invention will be described in even greater detail below based on the exemplary FIGURE. The invention is not limited to the exemplary embodiments. Other features and advantages of various embodiments of the present invention will become apparent by reading the following detailed description with reference to the attached drawing which illustrates the following:

FIG. 1 is a schematic view of a system for programming portable data carriers in accordance with an embodiment of the present invention.

DETAILED DESCRIPTION OF EXEMPLARY EMBODIMENTS

Referring to FIG. 1, a system 1 for programming portable data carriers, such as smart cards 50, in accordance with an exemplary embodiment of the present invention is shown. A portable data carrier typically at least includes a processor and non-volatile memory. Examples for portable data carriers are smart cards—including e.g. payment cards, SIM cards, secure multimedia cards and RFID cards—, USB token, TPM modules or M2M modules.

The system 1 includes an assignment unit 10, a data server 12 and multiple production equipment or units 16. The system 1 of FIG. 1 further shows a data preparation unit 14, a manager 22, a card issuer interface 26 to a card issuer 28, the smart cards 50 to be issued and an operator 24.

Data 60 is received at the card issuer interface 26 from card issuers 28 (e.g., financial institutions) who require smart cards 50 to be issued. The received data 60 are sent to the data preparation unit 14. The received data 60 could be raw personalization data (e.g. card owner name, card number and card owner address), preferably received from the card issuer 28 in a field-encrypted manner. However the personalization data may already be embedded in a complex format defined by the card issuer. Starting from the received data 60 the data preparation unit 14 creates data 62 in an equipment independent format, which is also referred to as the standard system format. Such data preparation may comprise a plurality of steps which are well-known as such. Exemplary steps are checking the input format of the data, reformatting the data if required, sorting the data for different cards into groups to be issued together and/or supplementing the data. Supplemented information preferably comprises further personal information (user-selected picture or application(s)), and/or cryptographic information (user keys, system keys, user certificates, system certificates . . . ).

The data preparation unit 14 prepares the received data 60 and thereby creates data 62 in an equipment independent format. Thus the format of the data 62 does not depend on the assignment which production unit 16 will issue the data carrier. The prepared data 62 are sent from the data preparation unit 14 to the data server 12.

Generally, the assignment unit 10 assigns the data 62 to at least one of the production unit 16A, 16B, 16C.

In a first variant the prepared data 62 are sent to the data server 12 automatically and before the step of assignment. Hence, the steps of data preparation and assignment can be performed independent from each other. When the assignment unit 10 informs the data server 12 about an assignment, by sending assignment information 52, the data server moves the assigned data from a general storage area into a container 32A which is associated with the assigned production equipment or unit 16A. The general storage area is provided for holding unassigned data. Preferably, the general storage area is adapted to store multiple sets of data 62, wherein each set of data 62 may be independently assigned to one of the production equipment.

In a second variant the assignment unit 10 sends a data preparation request 51 to the data preparation unit for the assigned data. The data server receives the prepared data 62 (having no assignment information). Assignment information 52 are sent from the assignment unit 10 to the data server 12 to inform the data server 12 about the assignment.

The data server 12 typically in this variant also receives the prepared data 62 before receiving the assignment information 52. Nevertheless for minimizing the size of a general storage area (for prepared unassigned data) in the data server, the assignment information 52 could be sent first such that received prepared data 62 are immediately stored in the container in accordance with their assignment.

In a third variant, basically using the same steps, the trigger 51 for data preparation is sent to the data preparation unit 14 before assigning the data to the production unit. For example, the assignment unit 10 first trigger preparation for unassigned data, then assign the data to the production unit and inform the data server 12 accordingly. Preferably, the assignment information 52 will be sent with a delay after triggering data preparation. The delay being adapted to guarantee that the prepared data 62 are received in the data server first.

Each container 32A, 32B and 32C is associated with a corresponding production unit 16A, 16B and 16C respectively. The container may have the form of a file directory or of a file.

The data server 12, which is also referred to as a data providing unit, preferably is a file server. Preferably, the name of the container indicates or is associated with the relevant production equipment.

Assuming a passive file server as the data providing unit, the assignment information 52 could be represented by a move- (or rename-) command instructing the file server to move the received prepared data 62 into the container 32A of the assigned production equipment 16A. Hence, a file would be moved into the container or renamed in order to form the container.

In the system the assignment unit 10 receives status information from a plurality of production units 16 via an equipment interface 20 of each of the production units 16. A ping 40 sent by the production unit 16 includes the status of the particular production unit 16 (e.g., in use, ready, on-hold, busy, busy with advance, needs servicing, idle, etc.). The ping may further include data describing the type of production unit 16 sending the ping 40 and/or data describing a configuration of the type of production unit 16. The assignment unit 10 receives and evaluates each ping 40. Further the equipment interface 20 provides detailed feedback or logging information for of the data carrier(s) issued.

The production unit 16 may comprise issuing modules 17A, 17B, 17C, 17D. The modules may be different modules such as embosser 17A, printer 17B, magnetic encoder 17C and chip reader 17D, but could as well comprise multiple identical modules, e.g. 2 embossers and 2 chip readers. Besides production units 16A, 16C personalizing the smartcard, the system may comprise production unit 16B required for the issuance process such as smartcard testing equipment, letter printer and so on.

Based on the status of the production unit 16 as reported by the pings 40, the assignment unit 10 assigns data 62 to the production unit 16A. The data may be represented by reference to a job (i.e., a request by a card issuer 28 to produce one, a batch, or a plurality of batches of smart cards 50) received via the card issuer interface 26. Additionally, this step by the assignment unit 10 can be performed dynamically and in real time, accounting for changes in production equipment status as reported by the pings 40. For example, if a first production unit 16A reports its status as 'ready' and other production unit 16B, 16C report their status as 'in use,' the assignment unit 10 can initially assign a batch of smart cards 50 to be produced to the first production unit 16A and later assign a portion of the batch to the second or third production unit 16B, 16C if the status thereof changes to 'ready.' For efficiency the assignment unit 10 could also split batches to be used on different production units 16.

The first time the assignment unit 10 receives a ping 40 from a particular production unit 16, the assignment unit 10 incorporates that production unit 16 and incorporates the new production unit 16 into the running schedule based on its equipment type and status. Further, the assignment unit 10 can estimate the length of time for a particular production unit 16 will take to complete a job based on the amount of smart cards 50 and the production unit type in order to assist in scheduling subsequent jobs and apportioning the data 62 received from the card issuer interface 26 at the data server 12. Additionally or alternatively, the pings 40 may provide job completion updates, such as a percentage complete, or an expected remaining time until completion.

Once the assignment unit 10 determines an amount of smart cards 50 that will be produced by a particular production unit 16A, the data 62 from the card issuer for producing those smart cards 50 is saved in a container 32A of the data server 12 by the assignment unit 10 or the data preparation unit 14. At any point in time before storing the job in the container 32, the data from the card issuer 62 is converted to the standard format 62 by the data preparation unit 14.

The manager 22 can be used in addition to the assignment unit 10 to perform additional scheduling. The assignment performed by the assignment unit could be regarded as a step of scheduling on the equipment level. In addition the manager could perform a step of scheduling for the job level. Hence, the manager 22 out of the plurality of available data will select certain data 60 to be used for issuing and inform 53 the assignment unit 10 accordingly. The scheduling of the manager will be based on an estimated capability of the production unit 16 available in the system and could be based on priority of the card to be issued. The scheduling of the manager 22 considers the configuration of a production unit 16 or even the exchangeable modules 17 included in a production unit 16 as variables. In contrast thereto these parameters are considered to be fixed for the step of assigning in the assignment unit 10. Accordingly, the manager 22 may request to change configuration or the modules of the production unit. However, the manager 22 will not schedule based on the current status of the production unit.

For example, the manager 22 can perform scheduling of sub-steps that must be completed for each job, such as the use of different production units 16A-16C which utilize subsets of the data 62 in order to perform tasks, such as programming the chip of the smartcard in production unit 16A, printing a transport letter in production unit 16B and testing the smartcard in production unit 16C. The manager 22 can also assign job IDs and manage resources, such as monitoring an amount of blank smart cards 50 at the production unit 16 and a bin from which the production unit 16 should take such blank smart cards to complete a particular job, for example based on the job ID. The manager 22 can also inform an operator 24 when bins should be restocked with more or different blank smart cards, chips, ink, etc. The manager may be an ERP system. The manager 22 stores information about the issuing process to be used for each data set or job.

The containers 32 of the data server 12 are storage areas in the computer memory of the data server 12 and are partitioned in separate areas of the memory. A container 32 can be created in the memory of the data server 12 each time a production unit 16 registers with the assignment unit 10 (e.g., sends an initial ping 40 to the assignment unit 10).

The production unit 16 polls 42 respective containers 32 for data. Preferably, the polling is performed via/by a converter 18. A network connection between the production unit 16 and the data server 12 may be used in this regard. Any data 62 stored in the container are provided in their production unit independent format from the data server 12 to the production unit 16. The polling is considered to be data independent, i.e. the production unit polls for data without requesting specific data. The production unit does not even have to know whether currently data are provided for him or not.

Advantageously, the production units 16A-C are configured to search a respective container 32A-C for data in the standard format 62 stored therein and downloads said data 62. Thus, production unit 16A polls 42 container 32A, production unit 16B polls 42 container 32B, production unit 16C polls container 32C, etc. If the data server is formed by a file server, the production unit simply requests the files in its associated directory or its associated file.

In a further embodiment, each production unit 16 polls 42 via the converter 18 a general directory of the data server 12 for an ID associated with the particular production unit 16 searching the directory. In this embodiment, the assignment unit 10 or manager 22 assigns a unique ID to each production unit 16 which is included within the data 60, 62 or within the file name when the data is stored in the directory of the data server. Thus, each production unit 16 polls 42 the directory in order to search for its unique ID in the file name or in the data 62 stored within the file, and downloads said data 62. In order to provide more flexible access to the data, the production unit 16 can periodically receive or poll 42 an index for its ID including an address, such as a uniform resource locator (URL), for retrieving the data 62 on the data server 12 at some later point in time.

Each production unit 16 includes a converter 18 which receives the data in the production unit independent (standard) format 62 from the respective container 32 of the data server 12. The converter 18 includes software loaded on a processor which includes commands for converting the data 62 from the standard format to a single format readable by the particular production unit 16 based on the production unit type. Accordingly, each converter 18 is unique to a production unit type and is connected to an individual production unit 16 so as to perform a one to one translation of the data 62 from the standard format to a format corresponding to the individual production unit 16

The converter 18 is preferably a processor of the production unit 16. In this case, the software providing the logical conversion from the standard format is loaded onto the production unit 16, for example, from a CD-ROM. Alternatively, the converter 18 can be a separate processing unit which is located at the production unit 16 and communicates with its main processor to provide the converted data.

Once receiving the converted data from the converter 18, the production unit 16 programs and issues the smart cards 50 in accordance with the converted data. The smart cards 50 are produced through the modules 17 of the production unit such as an embosser 17A, a smart card chip programmer 17B, a laser module 17C and an indent printer 17D. The operator 24, typically a human operator, is responsible for ensuring that the production unit has all the materials, such as blank smart cards, necessary to complete a job or group of jobs. The manager 22, on the other hand, like the assignment unit 10, is preferably a computer or central processing unit.

The pings 40 and polls 42 can each be periodically performed, such as every few seconds, or each time the status of the production unit changes. The polls 42 can be performed, for example, when the status changes to 'ready' or 'idle' and data retrieved from the polls 42 can be stored in a queue at the data server 12 or the production unit 16.

Preferably, the assignment unit 10, data server 12, data preparation unit 14, production unit interface 20 and manager 22 are connected in a closed, secure network, such as a local area network, in order to communicate with respect to one another. The card issuer interface 26, which is typically located at a site of the card issuer 28, can be connected to the assignment unit 10 or the data preparation unit 14 through a secure data gateway using internet protocol.

While the invention has been particularly shown and described with reference to preferred embodiments thereof, it will be understood by those skilled in the art that various changes in form and details may be made therein without departing from the spirit and scope of the invention. Further, the present invention is not limited to the embodiments described herein; reference should be made to the appended claims.

The invention claimed is:

1. A method for managing issuance of a portable data carrier in a system comprising multiple production units that issue portable data carriers, a data provisioning unit and an assignment unit, the method comprising the steps:

designating in the data provisioning unit at least one container to each of the production units;

receiving data for the portable data carrier in the data provisioning unit in a production unit independent format;

assigning at least one production unit to use the data for issuing the portable data carrier in the assignment unit;

providing the data by the data provisioning unit to the assigned production unit, wherein in the step of providing the data, the data are provided in response to a data independent polling by the production unit for data stored in the at least one container designated to the production unit, the data are provided to the assigned production unit in a production unit independent format, and in the assigned production unit the provided data are converted from the production unit independent format into a production unit dependent format; and issuing the portable data carrier in the assigned production unit.

2. The method according to claim 1, wherein the assigned production unit polls for data stored in a directory designated to the production unit.

3. The method according to claim 1, wherein the assignment unit receives status information sent from the at least one production unit.

4. The method according to claim 3, wherein the status information are sent at regular intervals.

5. The method according to claim 3, wherein the status information are sent each time the status of the at least one production unit changes.

6. The method according to claim 3, wherein the assignment is performed based on the received status information.

7. The method according to claim 1, further comprising registering, at the assignment unit, the at least one production unit upon an status information being received from the at least one production unit by the assignment unit and incorporating the at least one production unit into the assignment based on the status information.

8. The method according to claim 1, wherein an identification of the at least one production unit is associated with at least one of the containers and a file name of the data in the production unit independent format.

9. The method according to claim 8, wherein the at least one production unit polls the container of the data provisioning unit at regular intervals.

10. The method according to claim 8, wherein the at least one production unit polls the container of the data provisioning unit upon issuing the portable data carriers.

11. A system for issuing a portable data carrier, the system comprising:
   a plurality of production units configured to communicate a status to an assignment unit, wherein
   at least one container is designated in a data server to each of the production units;
   the assignment unit is configured to assign data to at least one assigned production unit of the production units, to issue the portable data carrier, based on the status of the at least one production unit;
   the data server is configured to store the data in a production unit independent format in at least one container based on the assigned production unit scheduled to issue the portable data carriers, wherein the assigned production unit is configured to poll the at least one container so as to retrieve the data in the production unit independent format;
   the data are provided to the assigned production unit in response to a data independent polling by the assigned production unit for data stored in the at least one container designated to the production unit;
   the data are provided to the assigned production unit in the production unit independent format;
   a converter disposed at the assigned production unit, the converter configured to convert the data in the production unit independent format retrieved by the assigned production unit into data in a production unit dependent format; and
   the at least one production unit as arranged to use the data in the production unit dependent format to issue the portable data carrier.

12. The system according to claim 11, wherein the converter is unique to at least one of the production unit type and the configuration of the production unit.

13. The system according to claim 11, comprising a scheduler that is arranged to select data out of a plurality of available data that is used to issue and inform the assignment unit.

14. A production unit for issuing portable data carriers, the production unit comprising:
   a converter configured to poll data stored in a container of a data server that corresponds to the production unit and to convert the polled data from a production unit independent format to a production unit dependent format;
   a production unit interface configured to send a status information of the production unit to an assignment unit; and
   a plurality of modules configured to issue the portable data carrier in accordance with the data in the production unit dependent format, wherein
   the convert is configured poll the data in a data independent polling for data stored in the at least one container designated to the production unit, and
   the production unit is configured to receive the data in the production unit independent format, the converter converting the data from the production unit independent format to the production unit dependent format.

* * * * *